UNITED STATES PATENT OFFICE.

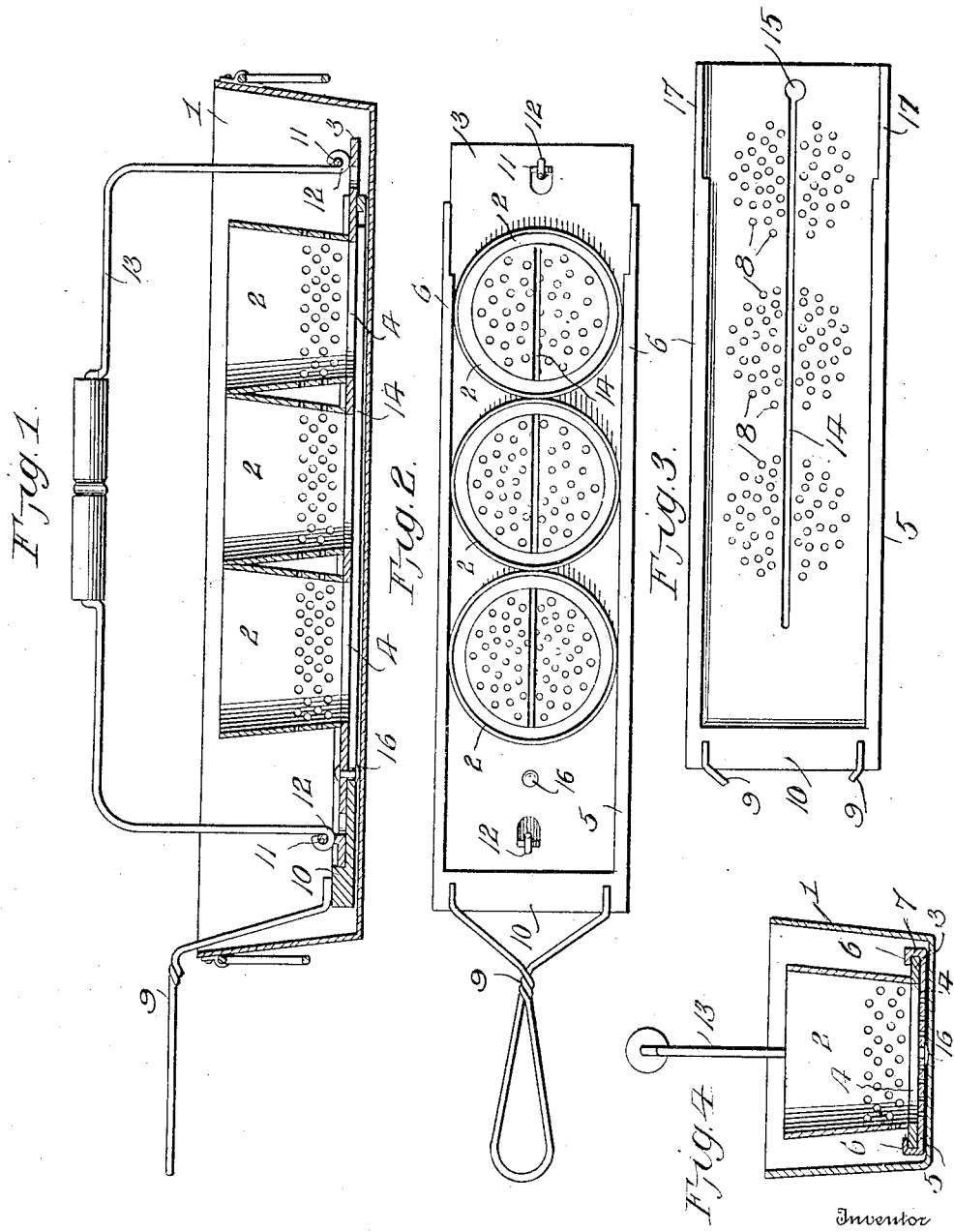

JOSEPH W. BROWN, OF CURRIES, NEVADA.

COOKING UTENSIL.

No. 869,690.  Specification of Letters Patent.  Patented Oct. 29, 1907.

Application filed March 8, 1907. Serial No. 361,305.

*To all whom it may concern:*

Be it known that I, JOSEPH W. BROWN, a citizen of the United States, residing at Curries, State of Nevada, have invented new and useful Improvements in Cooking Utensils, of which the following is a specification.

This invention relates to culinary articles and relates more particularly to an egg poacher.

The invention has for one of its objects to improve and simplify the construction and operation of devices of this character so as to be comparatively easy and inexpensive to manufacture, composed of few parts, and adapted to be easily manipulated.

A further object of the invention is the provision of an egg poacher in which a plurality of cups for receiving the individual eggs are slidably mounted on a bottom plate, whereby the eggs can be dropped out one at a time from the cups when they are cooked, upon pieces of toast or plates.

Another object of the invention is to so construct and arrange the parts of the poacher that they can be readily disassembled for the purpose of cleaning.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of my invention, Figure 1 is a central longitudinal section of the egg poacher. Fig. 2 is a plan view of the poacher removed from the water pan and showing the bail in section. Fig. 3 is a plan view of the supporting plate and holder of the poacher. Fig. 4 is a transverse section.

Similar reference characters are employed to designate similar parts throughout the several figures of the drawing.

Referring to the drawing, 1 designates a pan of suitable form for holding the boiling water used for poaching the eggs. The poacher which is adapted to be placed in the pan, comprises a plurality of frusto-conical cups 2 of sheet metal that are fixedly connected with a slide plate 3. This plate is provided with openings 4 that are of the same diameter as the bottom ends of the cups so that the poached eggs can be readily dropped through the openings. The slide plate 3 is rectangular and is mounted in a holder 5. This holder consists of a rectangular plate having upwardly extending flanges 6, as shown in Fig. 4, that are longitudinally slotted in their opposed surfaces and in the slot 7, the longitudinal edges of the slide plate 3 engage. The holder 5 constitutes a removable bottom for the cups 2 and portions of the holder that register with the openings 4 of the slide plate are provided with perforations 8, so as to permit of a free circulation of water upwardly into the cups and the cups 6 are perforated at their lower ends for promoting the circulation. The holder 5 is equipped with a handle 9, whereby the poacher can be picked up. The end of the holder adjacent the handle 9 is formed with a transverse flange 10 that serves as a stop on which the inner end of the slide plate 3 abuts. The slide plate has apertured lugs 11 stamped upwardly therefrom which receive the eyes 12 of the bail 13 which serves as a convenient handle for picking up the poacher. Extending longitudinally of the holder 5 is a central slot 14 having one end enlarged as at 15. In this slot moves a rivet or pin 16 that is attached to the slide plate 3. When the slide plate 3 is moved to the extreme left position, the head of the rivet 16 can pass through the enlargement 15, as in attaching the plate to the holder 5. In order to permit the plate to be detached, the flanges 6 of the holder are cut away at 17 so as to enable the plate 3 to be raised off the holder.

From the foregoing description taken in connection with the accompanying drawing, the advantages of the construction and of the method of operation will be readily apparent to those skilled in the art to which the invention appertains. In using the egg poacher, the pan 1 is supplied with boiling water, as usual, and the egg poacher with the parts in the position shown in Fig. 1, is placed in the pan. The hot water passes into the cups 2 through the apertures therein and in the holder 5. The eggs are then dropped into the cups and permitted to cook. After the eggs are poached, the poacher is lifted out of the pan by means of the bail 13, and then by taking the handle in one hand and the bail 13 in the other, the plate 3 can be slid outwardly from the holder so that the eggs will drop out one by one through the openings in the slide plate. It will thus be seen that the eggs can be taken out with very little trouble and without causing the eggs to break.

I have described the principle of operation of the invention, together with the apparatus which I now consider to be the best embodiment thereof, but desire to have it understood that the apparatus shown is merely illustrative and that such changes may be made when desired, as are within the scope of the claims.

Having thus described the invention, what I claim is:—

1. In a cooking utensil, the combination of a plurality of cups having open bottoms, a slide plate having openings alining with the bottoms of the cups, a handle attached to the plates, a holder on which the plate is slidably mounted and serving as bottoms for the cups, and a handle attached to the holder.

2. In a cooking utensil, the combination of a holder, a plate slidably mounted thereon and having openings, means on the holder forming guides for the plate, and cups rigidly mounted on the plate around the openings thereof.

3. In a cooking utensil, the combination of a plurality of cups having open bottoms, a plate to which the cups are secured having openings alining with the bottoms of the cups, a holder on which the plate is movably mounted and serving as the removable bottoms for the cups, a hand hold for the holder, a hand hold for the plate, and means for guiding the plate on the holder.

4. In a cooking utensil, the combination of a cup provided with an open bottom and having its walls apertured adjacent the bottom, a plate having an opening of the same diameter as the internal diameter of the cup at its bottom, a hand hold secured to the plate, a holder serving as a removable bottom for the cup and provided with apertures opening into the cup, means for guiding the plate on the holder, and a handle on the holder.

5. In a cooking utensil, the combination of a plurality of cups having open bottoms, a plate provided with openings registering with the cups, a bail attached to the plate, a holder for the plate provided with a longitudinal slot having an enlarged end, a headed member engaging in the slot and removable through the enlarged end thereof for detachably securing the holder and plate together, and a handle secured to the holder.

In testimony whereof, I affix my signature in presence of two witnesses.

JOSEPH W. BROWN.

Witnesses:
H. A. CODE,
C. C. HALEY.